Dec. 6, 1960            L. PÉRAS            2,963,115
SERVO-ACTION LOCKING DEVICES FOR VEHICLES
Filed Jan. 29, 1959
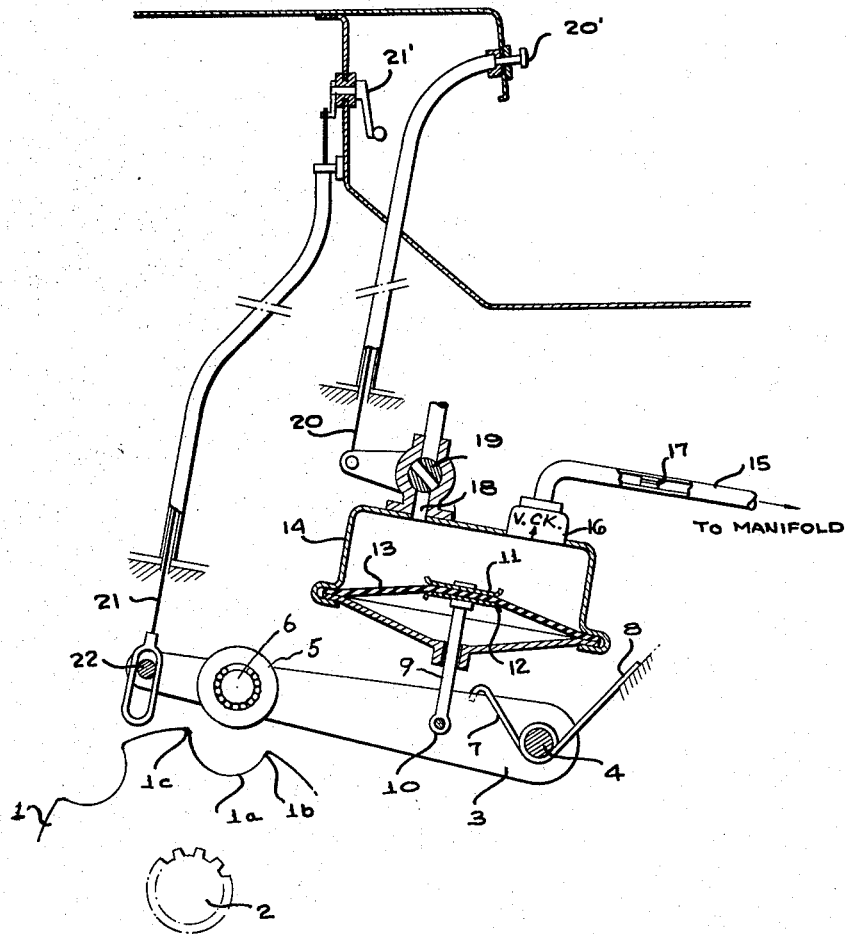
INVENTOR
Lucien Péras
BY
*Stevens, Davis, Miller & Mosher*
                         ATTORNEYS

United States Patent Office 2,963,115
Patented Dec. 6, 1960

2,963,115
SERVO-ACTION LOCKING DEVICES FOR VEHICLES

Lucien Péras, Billancourt, France, assignor to Regie Nationale des Usines Renault, Billancourt, France Filed Jan. 29, 1959, Ser. No. 789,847

Claims priority, application France Feb. 6, 1958

2 Claims. (Cl. 188—69)

It is current practice, amongst drivers of automotive vehicles having a conventional transmission, to increase the safety resulting from the handbrake when they wish to hold the vehicle against motion on a sloping road by engaging a high-reduction gear, generally the low gear or the reverse, in order to cause the reaction torque of the engine to assist in holding the vehicle against movement.

However, with the increasing trend towards the use of automatic clutches, whether of centrifugal, hydraulic or electromagnetic type, through which no torque is transmitted when the vehicle is still, this expedient becomes ineffective. This drawback led manufacturers to use a special locking device, generally called parking brake, usually incorporated in the gearbox, to give the additional safety which, with conventional clutches, results from the engine reaction torque.

However, hitherto known locking devices of this character have two drawbacks:

On the one hand, when the vehicle is held against movement on a steep road by this device to release the latter requires not only a considerable effort from the driver but also the transmission of this effort through the operating linkage; consequently, this linkage must be particularly efficient and rigid, and therefore costly.

On the other hand, the driver might forget to release the device and attempt to start from rest while the vehicle is locked.

Now it is the essential object of this invention to provide a servo-action locking device which not only requires an extremely moderate effort from the driver and through the control linkage for its operation, but will be released automatically when the engine is started, even if the driver forgot to operate said control linkage. The device of this invention is also provided with hand control means whereby, outside conditions of normal use, the device may be released at any moment, for example in emergency cases or when the vehicle must be towed.

In order to afford a clearer understanding of this invention and of the manner in which the same may be carried out in the practice, reference will now be made to the accompanying drawing forming part of this specification and illustrating diagrammatically by way of example in the single figure thereof a typical form of embodiment of a servo-action locking device constructed according to the teachings of this invention.

According to a known arrangement the locking device proper comprises on the one hand a notched disc 1 rotatably solid with the wheels of the vehicle, in this case through the gearbox output shaft 2, and on the other hand a lever 3 pivoted on a pivot pin 4 fixed in relation to the vehicle, this lever carrying a locking roller 5 rotating freely on a pivot pin 6 for example through the medium of a needle bearing or cage. Moreover, a spring 7 reacting with one end on the lever 3 and with the other end on a fixed part at 8 urges the lever 3 constantly against the disc 1.

The bottom 1a of the notches formed in the disc 1 is of substantially semi-circular configuration so as to receive the roller 5 with a moderate clearance.

The edges of the teeth formed between adjacent notches are rounded as shown at 1b so that the roller 5 urged by spring 7 cannot engage the bottom of the notch unless the rotational speed of disc 1 is null or very low. To this end, the force of spring 7, the weight or mass of lever 3 and the curvature of the rounded edges 1b are so calculated that when the velocity of rotation of disc 1 exceeds a very low value the roller 5 will rebound on the edges of the notches without engaging their bottom and therefore without being capable of holding the shaft 2 against rotation. The purpose of this arrangement already known per se is to prevent the locking device from being engaged when the vehicle is running.

According to this invention, the device comprises the following operating means:

A small link 9 pivoted with one end 10 on the lever 3 has its other end solid with a pair of discs 11, 12 clamping a diaphragm 13 mounted in a fluid-tight manner, for example by crimping, on the edge of a bell-shaped casing 14.

The chamber formed in the bell-shaped casing 14 and bound by the diaphragm 13 may be connected on the one hand through a pipe 15 comprising a non-return valve 16 and a gauged orifice 17 to the induction manifold or pipe of the engine, and on the other hand through an orifice 18 controlled by a valve member 19 to the atmosphere. The valve 19 may be controlled if desired by means of a rod or cable 20 leading to a control knob or lever 20' within easy reach of the driver's hand; thus, if desired, this rod or cable may be actuated by the gear shift lever having for example a "Parking" position to this end.

Finally, a control rod or flexible cable 21 pivotally attached at 22 to the lever 3 is provided to enable the driver to release this lever from the disc 1 against the resistance of spring 7. The control member 21 is also at the driver's disposal by means of a lever or handle 21' but its operation is effected only in very specific cases; therefore, the corresponding control means needs not be so easily accessible as the normal control means 20.

This device operates as follows:

When the driver wishes to operate the locking device, he simply actuates the control member 20 to open the valve 19, thereby connecting the inner chamber of the bell-shaped casing 14 with the atmosphere even if at that time the engine is running and creating a suction in the induction manifold, for the cross-sectional area of the orifice 18 is considerably greater than that of the gauged orifice 17.

Under these conditions, no appreciable effort is exerted on the membrane 13, and the lever 3 is thus urged by the spring 7 towards the disc 1 until the roller 5 engages this disc.

If at that time the roller 5 registers with a notch in this disc 1 it will engage this notch down to its bottom.

If, on the contrary, the roller 5 engages a "tooth" between two adjacent notches of the disc 1 it will remain thereon and will drop into a notch only if the vehicle begins to move, thereby causing the disc 1 to rotate. As this initial movement cannot take place unless the speed is extremely low, the roller 5 will engage the notch home without rebounding on the rounded edges 1b.

Immediately as the roller 5 engages the bottom of a notch in the disc 1, the vehicle is locked against movement.

From the foregoing it is clear that the immediate actuation of the locking device takes place only at the driver's will, that is, when the control member 20 is actuated. However, if the vehicle must remain stationary for a relatively long time the action exerted by the locking device will complete that of the handbrake in holding the vehicle against movement, this occurring after the more or less extended time period necessary for the inner chamber of bell-shaped casing 14 to resume the atmospheric pressure the length of this time period depending on the fluid-tightness of the two valves 16 and 19.

When the vehicle engine is re-started and without requiring any control action from the driver the vacuum produced in the induction manifold of the engine will unseat the valve 16 and become effective in the chamber of the bell-shaped casing 14, thus attracting the membrane 13 and lifting the lever 3 against the resistance of spring 7; under these conditions, the device is released, thus making it impossible to start the vehicle from rest with a locked transmission in case the latter were left inadvertently in its locked condition. If the control member 20 is linked with a "Parking" position of the gear-shift lever, the automatic safety release means will become operative in any case when the engine is running and the gear-shift lever moved to a position other than the aforesaid "Parking" position.

It will be readily understood that a simple vacuum control of the locking lever connected to the induction manifold of the engine would certainly provide an automatic operation of the device responsive to the engine operation, but this solution would offer the serious inconvenience that, in case the engine were stopped unexpectedly before the vehicle is stopped completely, the locking device would be operated, thus causing a shock very dangerous for the transmission members; now with the arrangement of this invention this risk is definitely avoided.

Under certain specific circumstances such as the towing of a vehicle with the engine stopped, the driver may actuate the control cable or rod 21 to remove the lever 3 from the disc 1 against the resistance of spring 7, thereby suppressing the locking action of the device.

Of course, the vacuum casing 14 may be replaced by any other suitable vacuum device of equivalent character and adapted to be connected under the same condition with the induction manifold or pipe of the engine and with the surrounding atmosphere.

It will be readily understood by anybody conversant with the art that many modifications as to the size, shape and relative arrangement of the parts may be brought to the device shown and described herein, without however departing from the spirit and scope of the invention as set forth in the appended claims.

I claim:

1. A servo-locking device for a vehicle equipped with an engine and a source of vacuum operated thereof and having a shaft rotatably solid with the wheels of the vehicle, said device comprising a peripherally notched disc fixedly circumposed on the shaft, a locking member lockingly engageable with the notches in the disc, spring means connected to the locking member for urging the locking member relative to the disc, a servo-control means connected to the locking member for releasing the locking member from the disc, means connecting the servo-control means to the source of vacuum and including a non-return valve and a calibrated orifice in series therewith and means for establishing engagement of the locking member with the disc, said last means including a valve provided to vent the servo-control means to the atmosphere and means actuated by the driver of the vehicle for operating said valve.

2. A device according to claim 1, characterized in that separate hand control means are provided in combination therewith for positively retracting said locking member from its locking engagement with said notched disc.

References Cited in the file of this patent

UNITED STATES PATENTS

| | | |
|---|---|---|
| 2,086,661 | Collins | July 13, 1937 |
| 2,201,125 | Freeman | May 14, 1940 |
| 2,335,533 | Reavis | Nov. 30, 1943 |
| 2,709,504 | Mamo | May 31, 1955 |

FOREIGN PATENTS

| | | |
|---|---|---|
| 84,061 | Sweden | Aug. 13, 1935 |